United States Patent [19]

Okamoto et al.

[11] Patent Number: 5,523,639

[45] Date of Patent: Jun. 4, 1996

[54] ELECTROSTATIC ACTUATOR HAVING FERROELECTRICS IN WHICH RESIDUAL DIELECTRIC POLARIZATION IS FORMED

[75] Inventors: Iwao Okamoto; Isatake Kaitsu; Minoru Takahashi, all of Kawasaki, Japan

[73] Assignee: Fujitsu Limited, Kanagawa, Japan

[21] Appl. No.: 284,246

[22] Filed: Aug. 2, 1994

[30] Foreign Application Priority Data

Nov. 25, 1993 [JP] Japan .................................. 5-295691

[51] Int. Cl.⁶ .................................................. H02N 1/00
[52] U.S. Cl. ............................................ 310/309; 318/116
[58] Field of Search ..................................... 310/308, 309, 310/12; 318/116

[56] References Cited

FOREIGN PATENT DOCUMENTS

| | | |
|---|---|---|
| 62-44079 | 2/1987 | Japan . |
| 63-95858 | 4/1988 | Japan . |
| 3-65083 | 3/1991 | Japan . |
| 3-169278 | 7/1991 | Japan ................................... 310/309 |
| 4-172973 | 6/1992 | Japan . |
| 5-73850 | 3/1993 | Japan . |
| WO91/16757 | 10/1991 | WIPO . |

*Primary Examiner*—R. Skudy
*Attorney, Agent, or Firm*—Nikaido Marmelstein Murray & Oram

[57] ABSTRACT

An electrostatic actuator includes a supporting body having a plurality of electrodes are formed at predetermined intervals, and a movable body having a ferroelectrics layer having an area on which polarization charges based on residual dielectric polarization are distributed in a predetermined polarity pattern so as to correspond to the plurality of electrodes of the supporting body. Due to changing, based on switching a pattern of polarities of voltages supplied to the plurality of electrodes, electrostatic attraction and repulsion between the plurality of electrodes of the supporting body and the area of the ferroelectrics layer on which the polarization charges are distributed, the movable body are moved on the supporting body.

16 Claims, 11 Drawing Sheets

ELECTROSTATIC ACTUATOR HAVING FERROELECTRICS IN WHICH RESIDUAL DIELECTRIC POLARIZATION IS FORMED

BACKGROUND OF THE INVENTION (1) Field of the Invention

The present invention generally relates to an electrostatic actuator continuously moving an object by using an electrostatic field, and more particularly to an electrostatic actuator having ferroelectrics in which residual dielectric polarization is formed. This type of electrostatic actuator is used, for example, as a flat electrostatic motor for straightly moving a plate-shaped object.

(2) Description of the Related Art

For example, International Patent Publication No. WO91/16757 discloses the following electrostatic actuator. This electrostatic actuator is formed of a stator having an insulator layer and a movable body having a resistive layer. On the insulator layer of the stator, a plurality of strip-like electrodes are formed so as to be arranged at predetermined intervals in parallel to each other. The movable body is on the stator under a condition in which the insulator layer and the resistive layer is in contact with each other. In this electrostatic actuator, voltages having a predetermined pattern (+V, −V and 0 volts) are applied to the strip-like electrodes. Due to electric fields formed by applying the voltages, bound electric charges (positive charges and negative charges) arranged in the predetermined pattern are induced in the resistive layer of the movable body. When the voltages applied to the strip-like electrodes are changed in accordance with a predetermined pattern, the attraction and repulsion between the bound electric charges induced in the resistive layer of the movable body and the electric fields formed by the strip-like electrodes are repeated. In this process, the movable body moves on the stator.

In the conventional electrostatic actuator described above, the bound electric charges induced in the resistive layer of the movable body is not maintained permanently. Thus, while the movable body is moving on the stator, the voltages must be applied to the strip-like electrodes at predetermined intervals to induce the bound electric charges. A time necessary for inducing the bound electric charges depends on a value obtained by multiplying a volume resistivity and a dielectric constant of the resistive layer together. If this value is large, a time for which the bound electric charges are maintained in the resistive layer is long. In this case, although a number of times of operations in which the voltages are applied to the strip-like electrodes to induce the bound electric charges in the resistive layer is decreased, the time necessary for inducing the bound electric charges in the resistive layer is increased in each operation. On the other hand, if the above value is small, the time necessary for inducing the bound electric charges in the resistive layer is decreased in each operation. However, since the time for which the bound electric charges are maintained in the resistive layer is decreased, the number of times of operations in which the voltages are applied to the strip-like electrodes must be increased. Thus, in both the cases, it is difficult to continuously and smoothly move the movable body at a high speed.

In addition, in a case where the bound electric charges are induced in accordance with the above principle, in order to increase a charge density of the bound electric charges so that sufficient drivability is obtained, relatively high voltages (+V and −V) must be applied to the electrodes. Thus, the insulation performance of the insulating layer of the stator must be improved. Furthermore, a switching operation of the high voltages must be performed at a high speed to move the movable body. Thus, electric characteristics of a voltage switching circuit must be improved.

SUMMARY OF THE INVENTION

Accordingly, a general object of the present invention is to be provide a novel and useful electrostatic actuator in which the disadvantages of the aforementioned prior art eliminated.

A more specific object of the present invention is to provide an electrostatic actuator in which the movable body can be continuously and smoothly moved at a high speed.

Another object of the present invention is to provide an electrostatic actuator in which the movable body can be moved by using low driving voltages.

The above objects of the present invention are achieved by an electrostatic actuator comprising: a supporting body having a plurality of electrodes are formed at predetermined intervals; and a movable body having a ferroelectrics layer having an area on which polarization charges based on residual dielectric polarization are distributed in a predetermined polarity pattern so as to correspond to the plurality of electrodes of the supporting body, wherein due to changing, based on switching a pattern of polarities of voltages supplied to the plurality of electrodes, electrostatic attraction and repulsion between the plurality of electrodes of the supporting body and the area of the ferroelectrics layer on which the polarization charges are distributed, the movable body are moved on the supporting body.

According to the present invention, the movable body are moved on the supporting body by using the attraction and repulsion between the polarization charges formed in the ferroelectrics layer based on the residual dielectric polarization and the electrodes on which polarities of voltages supplied thereto are switched. Thus, it is not necessary to induce the bound electric charges into the resistive layer of the movable body. As a result, the movable body can be smoothly moved at a high speed. In addition, it is not necessary to use a high voltage to induce the bound electric charges into the resistive layer of the movable body. Thus, the movable body can be moved by using a low voltage, and the voltage switching circuit can be simplified.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will be given of an embodiment of the present invention.

The applicant have proposed the following magnetic recording device (Japanese Laid-Open Patent Application No. 5-73850).

A magnetic head facing a plate-shaped magnetic recording medium on which a plurality of recording cells are formed is vibrated in a direction parallel to a surface of the magnetic recording medium. While vibrating the magnetic head, information is written in or read out from a recording cell on the magnetic recording medium via the magnetic head. In this magnetic recording device, to place the magnetic head on each of the recording cells formed on the magnetic recording medium, the plate-shaped magnetic recording medium is straightly moved by an electrostatic actuator. This electrostatic actuator applied to this type of the magnetic recording device will be described bellow.

Figure 2:
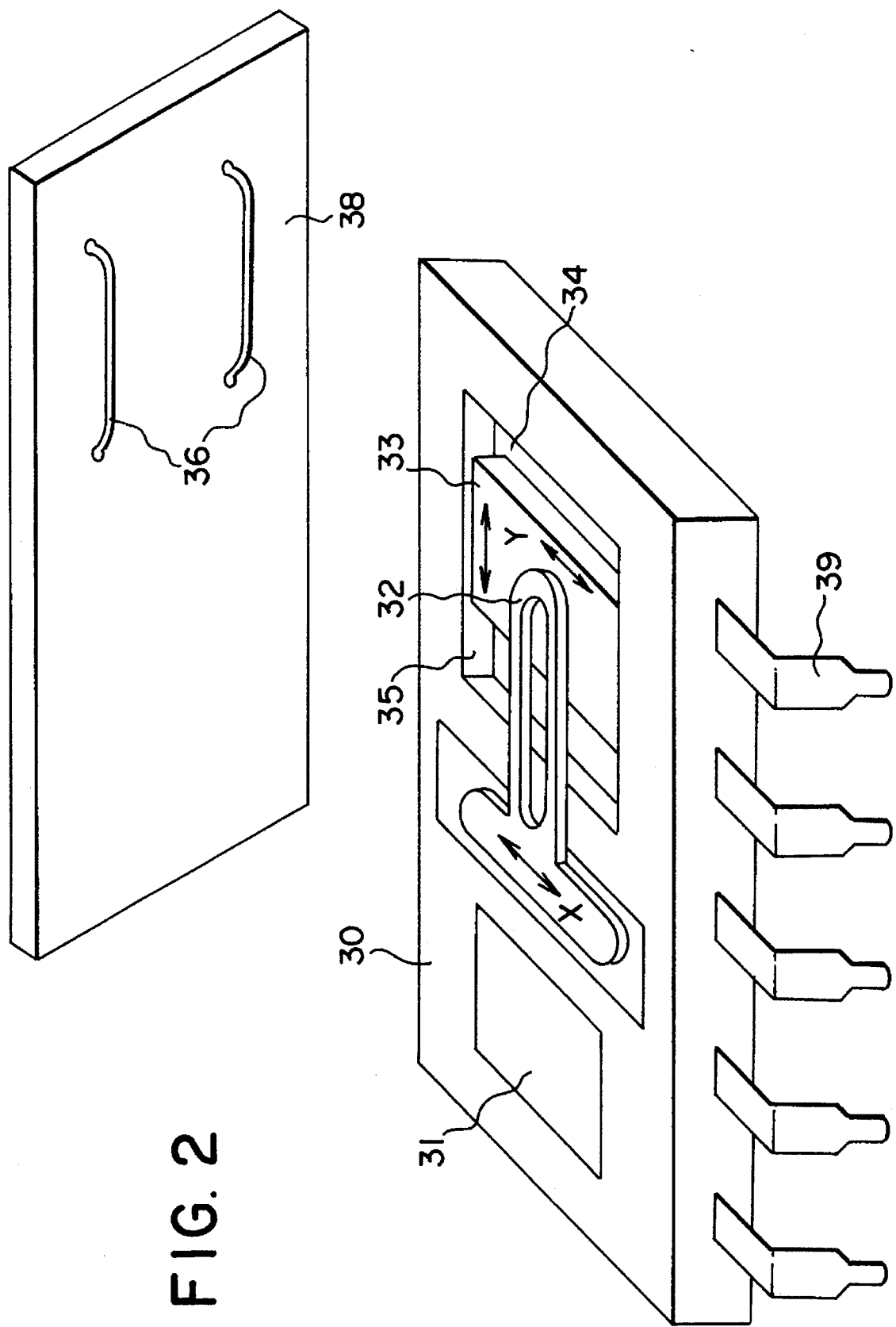
FIG. 2 is a perspective view showing a magnetic recording device to which the electrostatic actuator according to the present invention is applicable.

FIG. 2 shows a structure of the magnetic recording device to which the electrostatic actuator is applied. Referring to FIG. 2, an electronic circuit unit 31, a beam 32 on which a magnetic head is mounted and a recording plate 33 are housed in a package 30. The recording plate 33 is engaged with a concave portion formed on the package 30. The concave portion has a sliding surface 34 and side guiding surfaces 35. The recording plate 33 is guided by the side guiding surfaces 35 and slides on the sliding surface 34. The recording plate 33 has a ferroelectrics layer, a substrate layer (a smoothing layer) and a medium layer, as will be described later. The ferroelectrics layer is in contact with the sliding surface 34 and the medium layer faces the magnetic head mounted at the tip end of the beam 32. The recording plate 33 is moved by an electrostatic actuator in a Y direction, and the beam 32 is moved, in an X direction perpendicular to the Y direction, by an electrostatic actuator having the same structure as the electrostatic actuator for the recording plate 33. Due to the movement of the recording plate 33 in the Y direction and the movement of the beam 32 in the X direction, the magnetic head mounted on the tip end of the beam 32 can be placed on each of the recording cells formed on the recording plate 33. The beam 32 is vibrated by piezo-electric devices in a direction parallel to the surface of the recording plate 33. In a state where the beam 32 is vibrated, data is written in a recording cell on the recording plate 33 via the magnetic head or data is read out from a recording cell via the magnetic head. The electronic circuit 31 is provided with various circuits for processing signals, driving the beam 32 and driving the recording plate 33. Terminals of the various circuits and leads 39 projecting from side surfaces of the package 30 are electrically connected to each other.

Pressing springs 36 are provided on a rear surface of a lid 38. Each of the pressing spring 36 is formed of a thin wire made of phosphor bronze. The lid 38 is fixed on a top surface of the package 30 (by screws), so that the pressing springs 36 press on edge portions of the recording plate 33 at a pressure which does not prevent the recording plate 33 from sliding on the sliding surface 34. The pressure of the pressing springs 34 prevents the recording plate 33 from being lifted out of the sliding surface 34.

The recording plate 33 has, for example, an area of 8 mm×8 mm, and play between the recording plate 33 and the side surfaces 35 is equal to or less than 10 μm.

Figure 1:
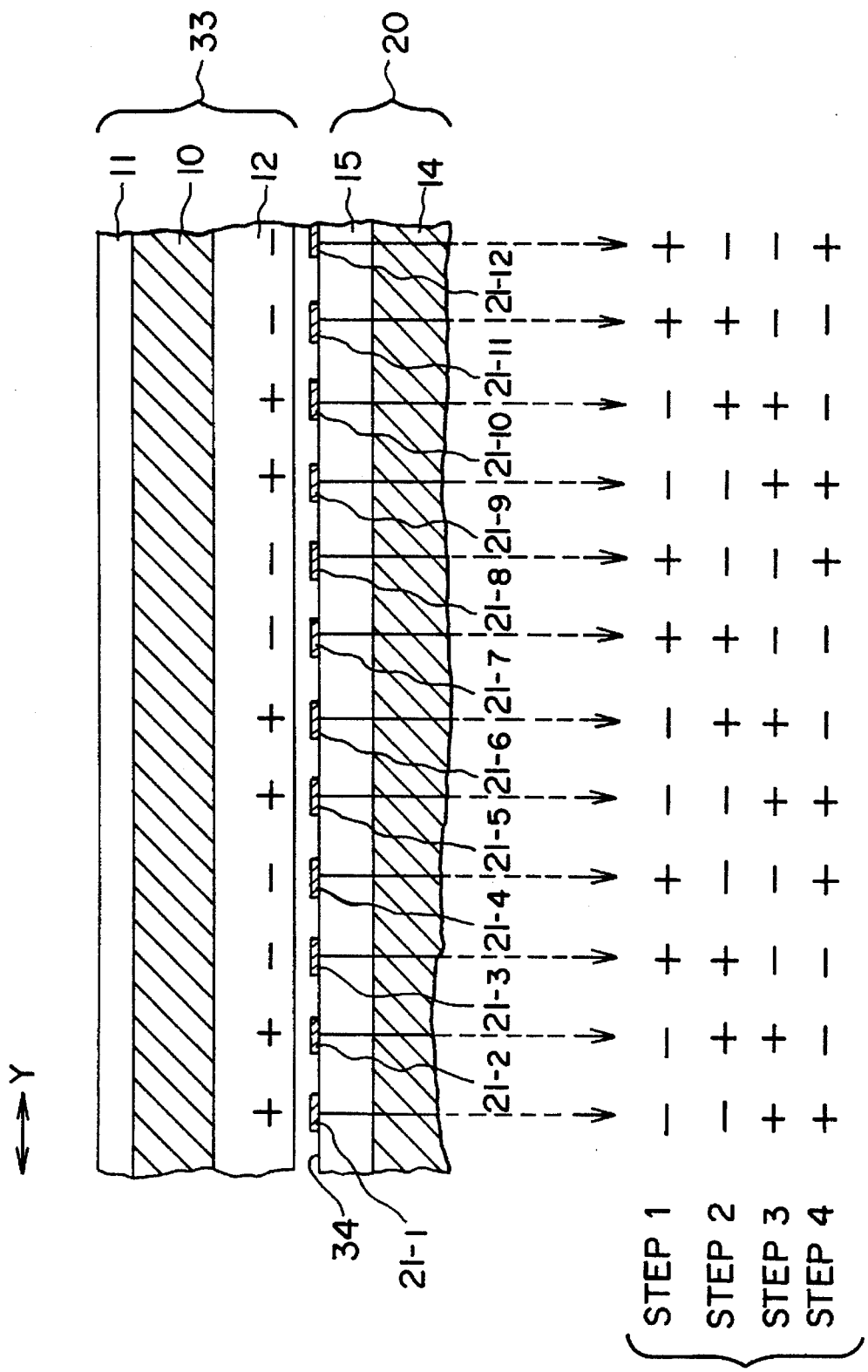
FIG. 1 shows a cross sectional view showing a structure of an electrostatic actuator according to an embodiment of the present invention.

An example of the structure of the recording plate 33 and a supporting block including the sliding surface 34 in contact with the recording plate 33 is shown in FIG. 1. Referring to FIG. 1, the recording plate 33 comprises a substrate layer 10, a medium layer 11 formed on a surface of the substrate layer 10 and a ferroelectrics layer 12 formed on another surface of the substrate layer 10. The substrate layer 10 is made, for example, of silicon single crystal, in which antimony is doped, having an electrical conductivity 0.1 Ω·cm. The thickness of the substrate layer 10 is about 200 μm. The medium layer 11 has a structure in which a CoCrTa-layer having a thickness of about 20 nm is stacked on a Cr-layer, as a foundation, having a thickness of about 100 nm. The ferroelectrics layer 12 is made of PZT (Lead Titanate Zirconate) and has a thickness of about 20 μm. A polarizing treatment is applied to the ferroelectrics layer 12, so that polarization strips having positive charges (+) and negative charges (−) based on the residual dielectric polarization are formed in a surface layer of the ferroelectrics layer 12. The respective polarization strips extend in a direction perpendicular to a direction (the Y direction) in which the recording plate is moved. A set of two polarization strips having positive charges (+) and a set of two polarization strips having negative charges (−) are alternately arranged at predetermined intervals in a direction parallel to the direction (the Y direction) in which the recording plate 33 is moved.

A supporting block 20 slidably supporting the recording plate 33 comprises a silicon layer 14 and an insulating layer 15 formed on a surface of the silicon layer 14, the insulating layer 15 being made of $SiO_2$. Electrodes $21_{-1}, 21_{-2}, \ldots, 21_{-12}$ made of aluminum are formed on a surface of the insulating layer 15 by using a vacuum evaporation process. The respective electrodes $21_{-1}, 21_{-2}, \ldots, 21_{-12}$ extend in the same direction as the polarization strips formed in the ferroelectrics layer 12, and arranged at the same intervals in the same direction as the polarization strips.

In the recording plate 33 and the supporting block 20 experimentally used, the residual dielectric polarization formed in the ferroelectrics layer 12 of the recording plate 33 was 50 μC (coulomb)/$cm^2$ and the coercive electric field was about 150 kV/cm. The width and length of each of the electrodes $21_{-1}, 21_{-2}, \ldots, 21_{-12}$ were respectively 1.5 µm and 6 mm. Each of the intervals at which the electrodes $21_{-1}, 21_{-2}, \ldots, 21_{-12}$ were arranged was 3 µm. Voltages to be applied to the electrodes $21_{-1}, 21_{-2}, \ldots, 21_{-12}$ were ±2 volts. Under a condition in which these voltages were applied to the electrodes $21_{-1}, 21_{-2}, \ldots, 21_{-12}$, the maximum value of the electric field formed in the ferroelectrics layer 12 (PZT) was 7 kV/cm which is equal to or less than one-tenth as large as the coercive electric field (150 kV/cm). In order to prevent the residual dielectric polarization from decreasing, it is preferable that the maximum value of the electric field formed in the ferroelectrics layer 12 (PZT) be equal to or less than one-third as large as the coercive electric field.

The above ferroelectrics layer 12 and the electrodes $21_{-1}, 21_{-2}, \ldots, 21_{-12}$ are essential parts of the electrostatic actuator.

The voltages applied to the electrodes $21_{-1}, 21_{-2}, \ldots, 21_{-12}$ are switched in accordance with steps 1, 2, 3 and 4 as shown in FIG. 1. In respective steps shown in FIG. 1, (−) represents a negative voltage (e.g. −2 volts) and (+) represents a positive voltage (e.g. +2 volts). When the voltages applied to the electrodes $21_{-1}, 21_{-2}, \ldots, 21_{-12}$ are switched in this manner, the electrostatic interaction between the electric fields generated from the respective electrodes $21_{-1}, 21_{-2}, \ldots, 21_{-12}$ and the positive and negative polarization strips in the ferroelectrics layer 12 causes the recording plate 33 to move on the supporting block 20 in the Y direction.

A description will now be given, with reference to FIGS. 3A, 3B, 3C, 4A, 4B and 4C, of an operation of the electrostatic actuator comprising the ferroelectrics layer 12 and the electrodes $21_{-1}, 21_{-2}, \ldots, 21_{-12}$ facing it.

Figure 3A:
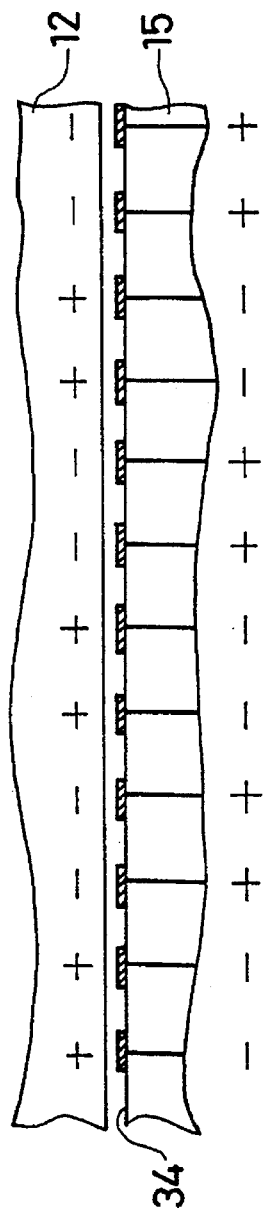
FIGS. 3A, 3B and 3C and FIGS. 4A, 4B, 4C and 4D are diagrams illustrating a operation of the electrostatic actuator according to the embodiment of the present invention.
Figure 3B:
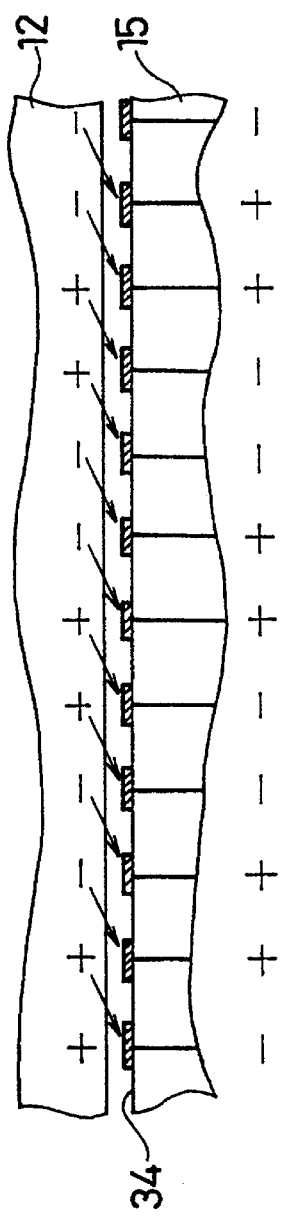
Figure 3C:
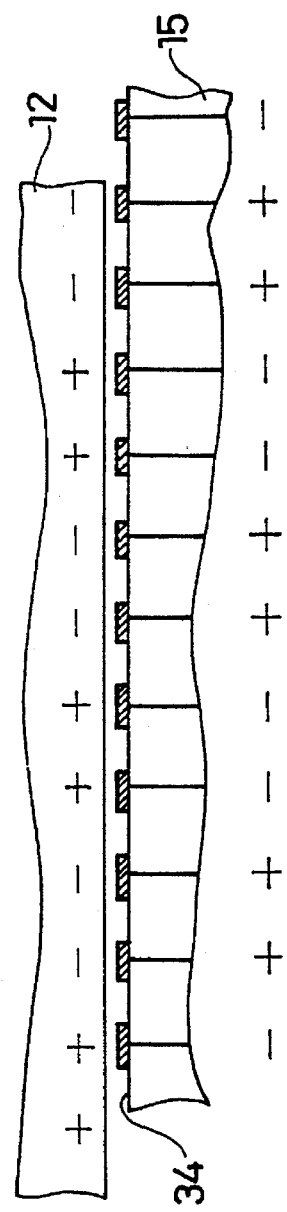
Figure 4A:
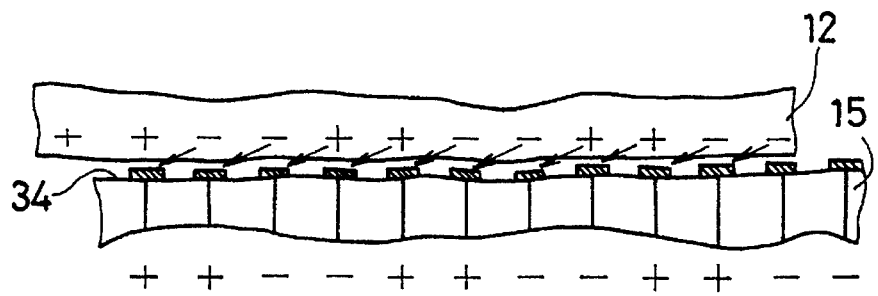
Figure 4B:
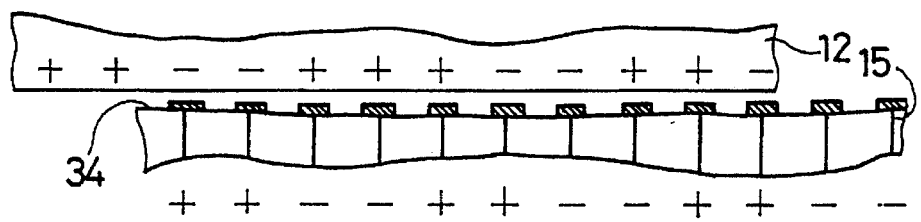
Figure 4C:
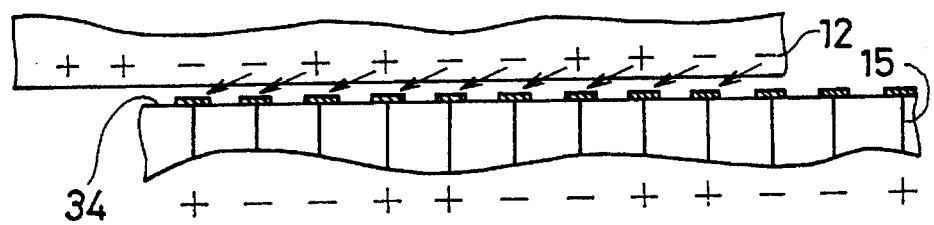
Figure 4D:
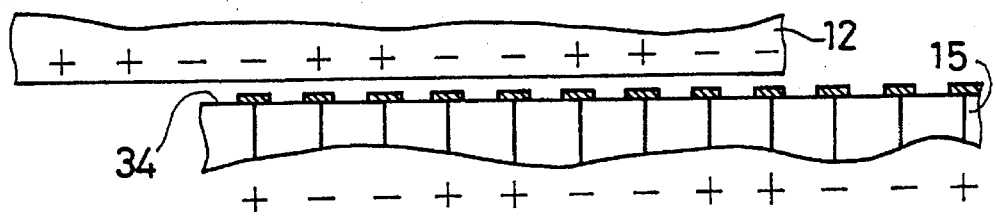

When voltages having a pattern in step 1 (see FIG. 1) are applied to the electrodes $21_{-1}, 21_{-2}, \ldots, 21_{-12}$, as shown in FIG. 3A, each electrode to which the positive voltage (+) is applied faces a negative (−) polarization strip in the ferroelectrics layer 12, and each electrode to which the negative voltage (−) is applied faces a positive (+) strip in the ferroelectrics layer 12. As a result, the ferroelectrics layer 12 is attracted to the electrodes $21_{-1}, 21_{-2}, \ldots, 21_{-12}$. In this state, when the pattern of the voltages applied to the electrodes $21_{-1}, 21_{-2}, \ldots, 21_{-12}$ is switched to the pattern in step 2 (see FIG. 1), as shown in FIG. 3B, the polarity of each of the electrodes $21_{-1}, 21_{-2}, \ldots, 21_{-12}$ is opposite to the polarity of a polarization strip facing an electrode adjacent to each of the electrodes. Each of the electrodes $21_{-1}, 21_{-2}, \ldots, 21_{-12}$ and the polarization strip which have opposite polarities are attracted to each other. As a result, as shown in FIG. 3C, the ferroelectrics layer 12 moves until each electrode and a polarization strip which have opposite polarities face each other. In this state, when the pattern of the voltages applied to the electrodes $21_{-1}, 21_{-2}, \ldots, 21_{-12}$ is switched to the pattern in step 3 (see FIG. 1), as shown in FIG. 4A, the polarity of each electrode is opposite to the polarity of a polarization strip facing an electrode adjacent to each electrode. The each electrode and a polarization strip which have opposite polarities are attracted to each other. As a result, in the same manner as the above, the ferroelectrics layer 12 moves until each electrode and a polarization strip which have opposite polarities face each other, as shown in FIG. 4B. Furthermore, in this state, when the pattern of the voltages applied to the electrodes $21_{-1}, 21_{-2}, \ldots, 21_{-12}$ is switched to the pattern in step 4 (see FIG. 1), in the same manner as the above, the ferroelectrics layer 12 moves by a length corresponding to each of intervals at which the electrodes $21_{-1}, 21_{-2}, \ldots, 21_{-12}$ are arranged (see FIG. 4C and FIG. 4D).

As has been described above, when the pattern of the voltages applied to the electrodes $21_{-1}, 21_{-2}, \ldots, 21_{-12}$ is switched in a cyclic order of steps 1, 2, 3 and. 4, the ferroelectrics layer 12 continuously moves on the electrodes $21_{-1}, 21_{-2}, \ldots, 21_{-12}$. That is, the recording plate 33 moves on the sliding surface of the supporting block 20 in a predetermined direction (the Y direction). When the switching operation of the pattern of the voltages applied to the electrodes $21_{-1}, 21_{-2}, \ldots, 21_{-12}$ is stopped and the voltages having a predetermined pattern are fixedly applied to the electrodes $21_{-1}, 21_{-2}, \ldots, 21_{-12}$, the ferroelectrics layer 12 is attracted to the electrodes and stops. That is, the recording plate 33 stops at a predetermined position.

Figure 5:
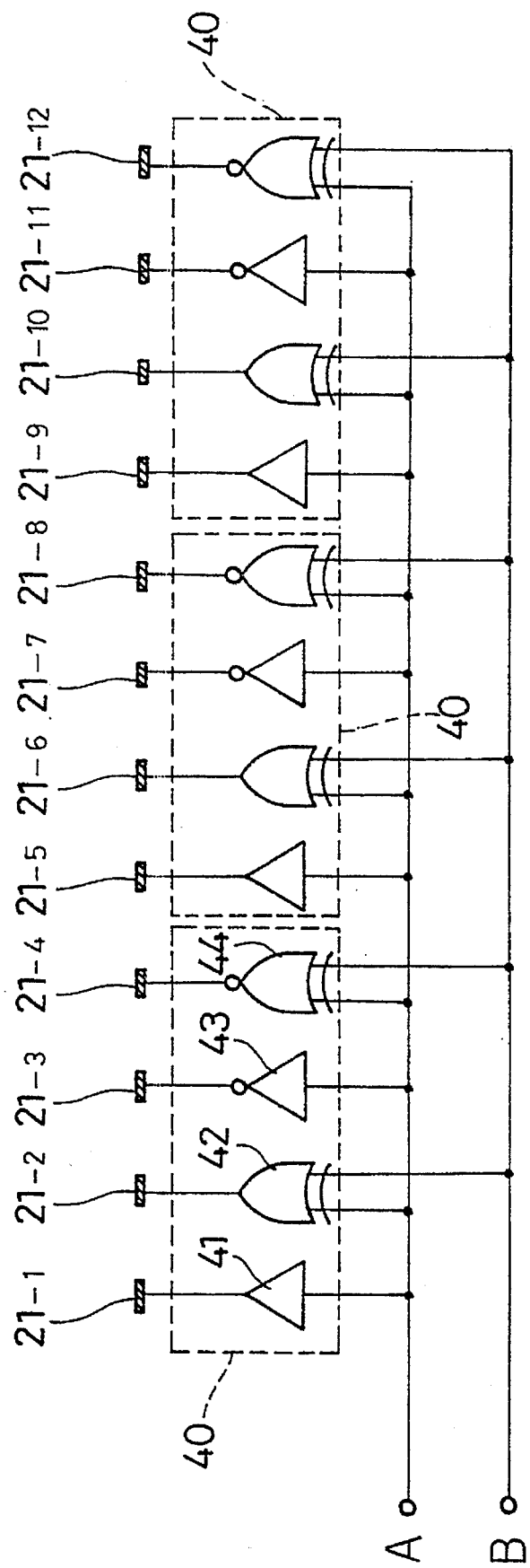
FIG. 5 is a circuit diagram illustrating a voltage switching circuit for the electrostatic actuator according to the embodiment of the present invention.

A voltage switching circuit for switching the pattern of the voltages applied to the electrodes $21_{-1}, 21_{-2}, \ldots, 21_{-12}$ is formed, for example, as shown in FIG. 5. Referring to FIG. 5, the electrodes $21_{-1}, 21_{-2}, \ldots, 21_{-12}$ are divided into electrode groups $(21_{-1}–21_{-4})$, $(21_{-5}–21_{-8})$ and $(21_{-9}–21_{-12})$. A switching circuit 40 is connected to each of the electrode groups. The switching circuit 40 has four logic circuit units: a driver circuit 41, an EOR (exclusive-OR) circuit 42, an inverter circuit 43 and an ENOR (exclusive-NOR) circuit 44. As to the electrode group $(21_{-1}–21_{-4})$, the electrode $21_{-1}$ is connected to an output of the driver circuit 41, the electrode $21_{-2}$ is connected to an output of the EOR circuit 42, the electrode $21_{-3}$ is connected to the inverter circuit 43 and the electrode $21_{-4}$ is connected to an output of the ENOR circuit 44. As to other electrode groups, the electrodes are connected to the switching circuit 40 in the same manner as those in the electrode group $(21_{-1}–21_{-4})$. Respective inputs of the driver circuit 41 and the inverter circuit 43 are connected to a terminal (A). Tow inputs of the EOR circuit 42 are respectively connected to the terminal (A) and a terminal (B), and also tow inputs of the ENOR circuit 44 are respectively connected to the terminals (A) and (B). A level of the ground voltage in the respective logic circuit units of the switching circuit 40 is maintained at a negative electric potential so that a negative voltage (e.g. −2 volts) is applied to an electrode when a logical output from a corresponding logic circuit unit is "0".

Figure 6:
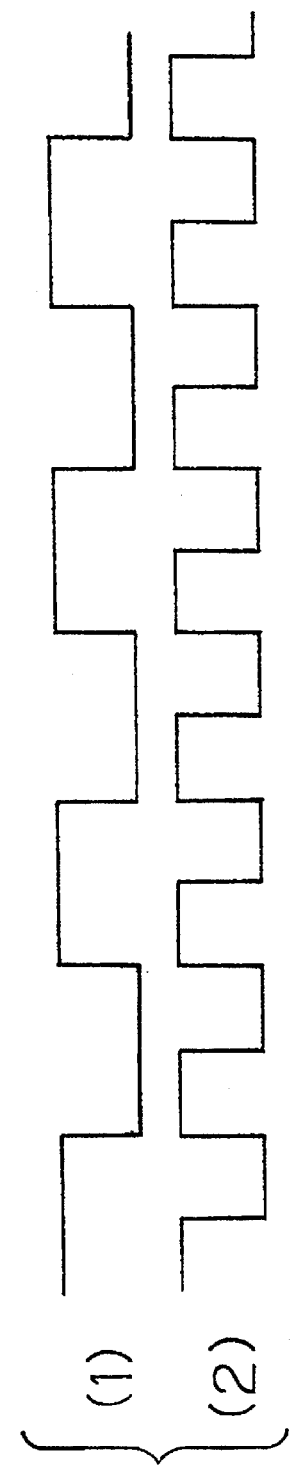
FIG. 6 is a wave form diagram illustrating switching pulse signals supplied to the voltage switching circuit.

To move the recording plate 33, the terminal (A) is provided with a first clock signal shown in FIG. 6(1) and the terminal (B) is provided with a second clock signal shown in FIG. 6(2). The second clock signal has a frequency twice as large as a frequency of the first clock signal. The first and second clock signals are synchronism with each other.

Figure 7:
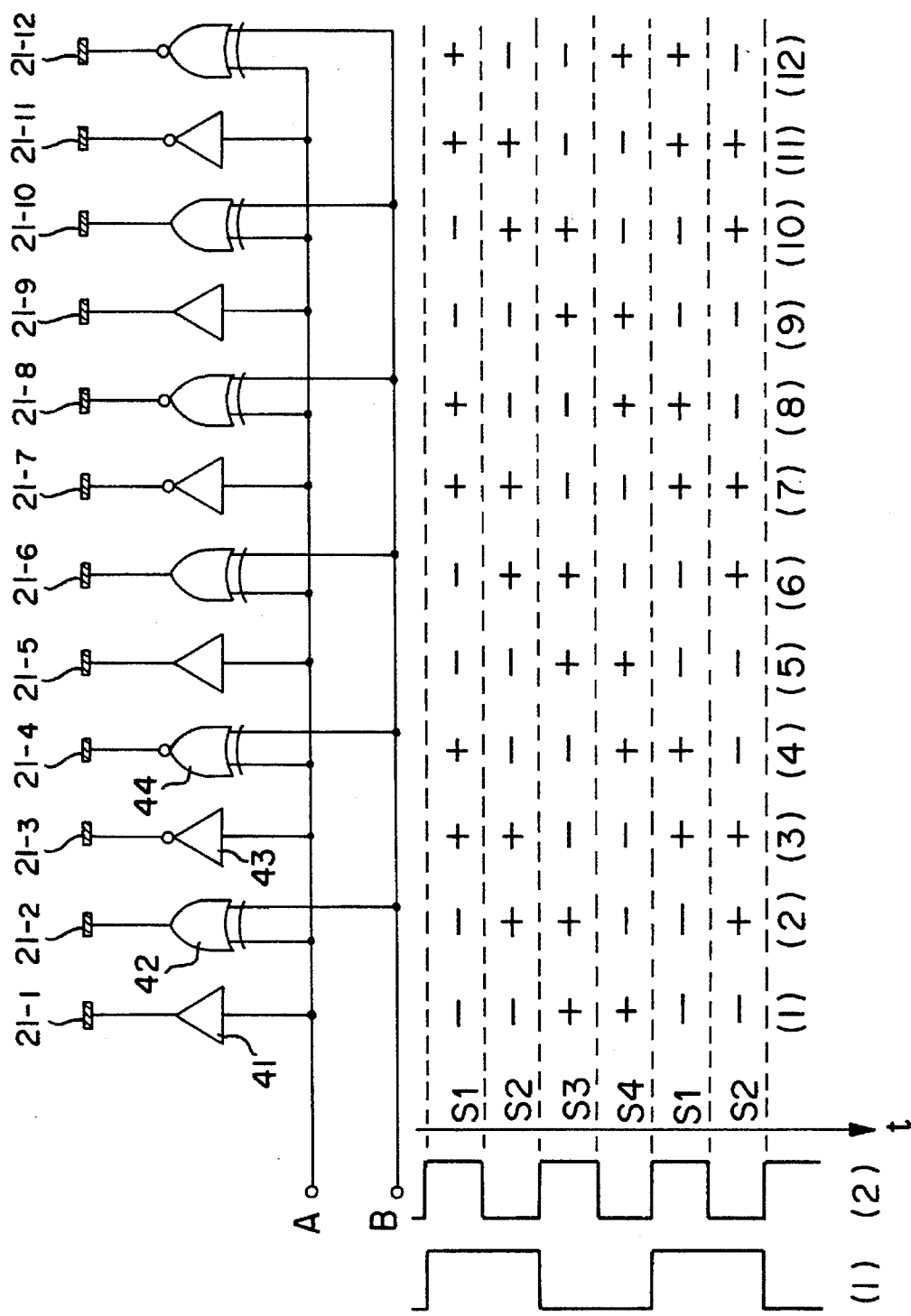
FIG. 7 is a timing chart illustrating an operation of the voltage switching circuit.

When the above first and second clock signals are supplied to the terminals (A) and (B), the patterns of the voltages applied to the electrodes $21_{-1}, 21_{-2}, \ldots, 21_{-12}$ are switched as shown in FIG. 7.

Referring to FIG. 7, when the first clock signal has a low level (a logic "0") and the second clock signal has a low level (the logic "0"), the output of the drive circuit 41 has a negative voltage, the output of the EOR circuit 42 has a negative voltage, the output of the inverter circuit 43 has a positive voltage and the output of the ENOR circuit 44 has a positive voltage. In this case, the voltages having the pattern in the step 1 (S1) are applied to the electrodes $21_{-1}, 21_{-2}, \ldots, 21_{-12}$. When the first clock signal maintains the low level and the second clock signal has a high level (a logic "1"), the output of the driver circuit 41 has the negative voltage, the output of the EOR circuit 42 has the positive voltage, the output of the inverter circuit 43 has the positive voltage and the output of the ENOR circuit 44 has the negative voltage. In this case, the voltages having the pattern in the step 2 (S2) are applied to the electrodes $21_{-1}, 21_{-2}, \ldots, 21_{-12}$. Furthermore, when the first clock signal is changed to the high level (the logic "1") and the second clock signal is changed to the low level, the output of the driver circuit 41 has the positive voltage, the output of the EOR circuit 42 has the positive voltage, the output of the inverter circuit 43 has the negative voltage and the output of the ENOR circuit 44 has the negative voltage. In this case, the voltages having the pattern in the step 3 (S3) are supplied to the electrodes $21_{-1}, 21_{-2}, \ldots, 21_{-12}$, In addition, when the first clock signal maintains the high level and the second clock signal is changed to the high level, the output of the driver circuit 41 has the positive voltage, the output of the EOR circuit 42 has the negative voltage, the output of the inverter circuit 43 has the negative voltage and the output of the ENOR circuit 44 has the positive voltage. In this case, the voltages having the pattern in the step 4 (S4) are supplied to the electrodes $21_{-1}, 21_{-2}, \ldots, 21_{-12}$.

As has been described above, when the first and second clock signals as shown in FIG. 7 (1) and (2) are supplied to the terminals (A) and (B), the pattern of the voltages applied to the electrodes $21_{-1}, 21_{-2}, \ldots, 21_{-12}$ is cyclically switched in the order of steps 1, 2, 3 and 4. Thus, the ferroelectrics layer 12 (the recording plate 33) is continuously moved on the electrodes $21_{-1}, 21_{-2}, \ldots, 21_{-12}$.

When the phase of the first clock signal is delayed by 90°, the direction in which the ferroelectrics layer 12 (the recording plate 33) is reversed.

The recording plate 33 is made as follows.

Figure 8A:
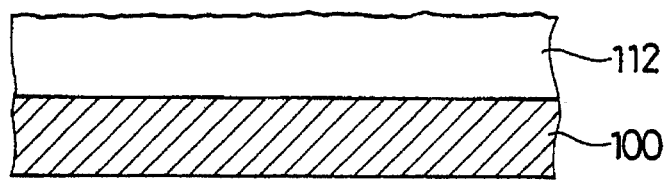
FIGS. 8A, 8B, 8C, 8D and 8E are diagrams illustrating a process for making a recording plate (the movable body)
Figure 8B:
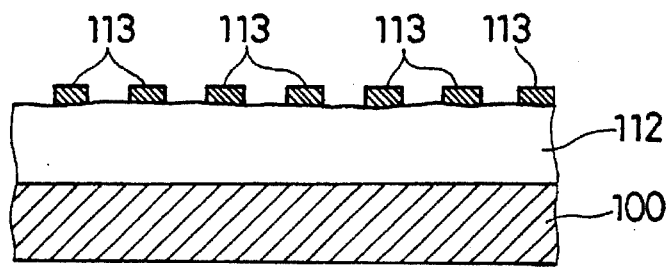
Figure 8C:
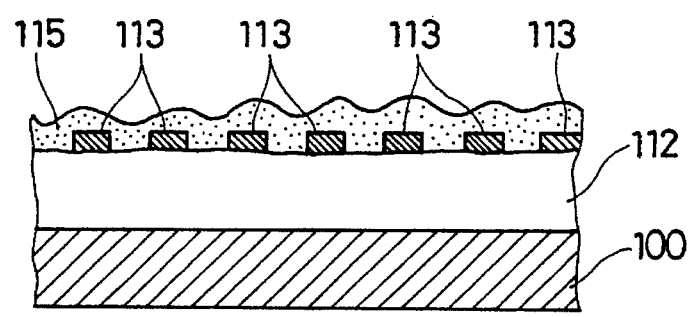
Figure 8D:
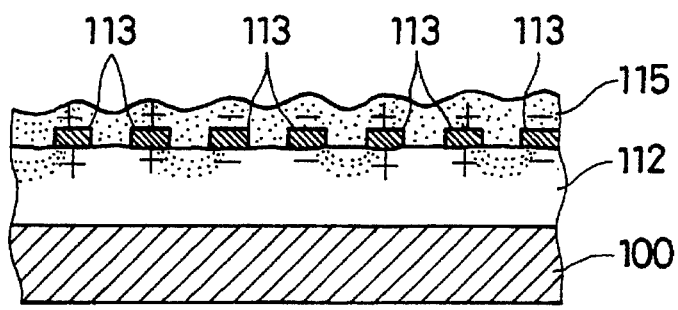
Figure 8E:
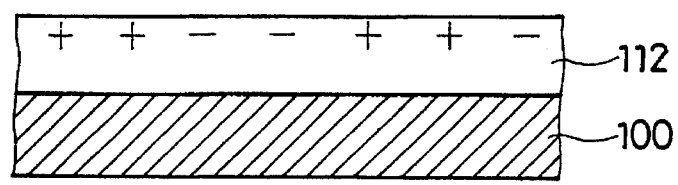
Figure 9:
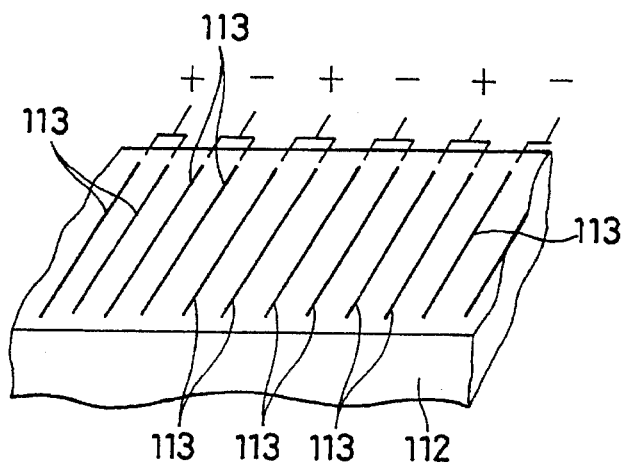
FIG. 9 is a diagram illustrating electrodes used for a polarizing process.

FIGS. 8A–8E show a process for making the ferroelectrics layer. First, as shown in FIG. 8A, PZT-layer 112 (the ferroelectrics) having the thickness of 20 μm is formed on a surface of a silicon substrate 100 by a doctor blade method. After this, the stacked structure of the silicon substrate 100 and PZT-layer 112 is sintered. Comb electrodes 113 are then formed on the surface of the PZT-layer 112 so as to be arranged at predetermined intervals, as shown in FIG. 8B. To prevent discharge from occurring between electrodes, a silicon oxide layer 115 is formed so as to cover the comb electrodes 113 as shown in FIG. 8C. In this state, the comb electrodes 113 are grouped into electrode pairs, each of the electrode pairs having two electrodes adjacent to each other. The positive voltage and the negative voltage are alternately applied to the electrode pairs as shown in FIG. 9. As a result, as shown in FIG. 8D, an electric field is formed between each pair of electrodes having opposite polarities. Due to the electric field, polarization strips corresponding to the comb electrodes 113 are formed in the surface layer of the PZT-layer 112. The polarization strips are arranged in accordance with a polarizing pattern (+, +, − and −), where + represents the positive polarity and − represents the negative polarity. To easily form the dielectric polarization, the stacked structure of the silicon substrate 100, the PZT-layer 112, the electrodes 113 and the silicon oxide layer 115 is heated to 300° C., and the stacked structure is then cooled in a state where the electric fields are formed in the PZT-layer 112. After this, the silicon oxide layer 115 and the comb electrodes are removed from the stacked structure by a etch-back method so that the smoothness of the surface of the PZT-layer 112 is maintained. As a result, a stacked structure of the silicon substrate 100 and the PZT-layer 112 in which the polarization strips are formed are made, as shown in FIG. 8E.

In the above process, the silicon oxide layer 115 may not formed. In this case, to prevent the discharge from occurring between the electrodes, the above polarizing process is performed under a condition in which the stacked structure of the silicon substrate 100, the PZT-layer 112 and the comb electrodes 113 is dipped in silicon oil.

Figure 10:
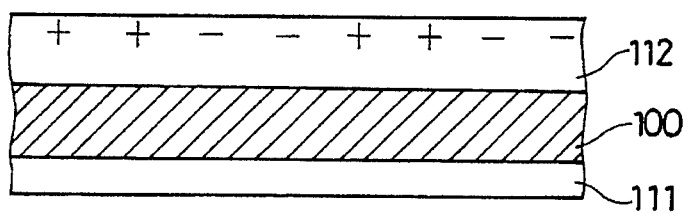
FIG. 10 is a cross sectional view showing a structure of the recording plate.

The surface of the silicon substrate 100 is polished, and a medium layer 111 is formed on the polished surface of the silicon substrate 100, as show in FIG. 10. The medium layer 111 comprises a Cr-layer as the foundation and a CoCrTa-layer. The formation of the medium layer 111 is performed by the biased sputtering method utilizing the conductivity of the silicon substrate 100.

In the above embodiment, the PZT-layer 112 (the ferroelectrics layer) and the medium layer 111 are respectively formed on the surfaces of the substrate layer 100. However, an amorphous carbon substrate may be substituted for the silicon substrate 100.

Figure 11:
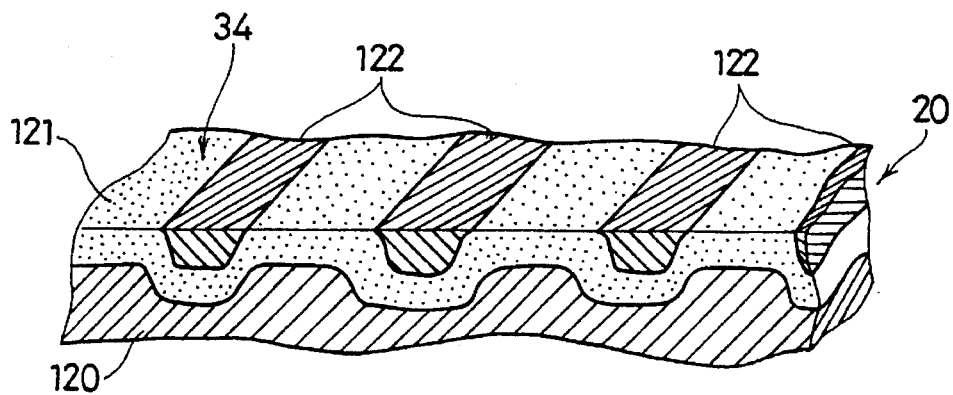
FIG. 11 is a diagram illustrating another structure of a supporting block.

Another example of a structure of the supporting block 20 on which electrodes of the electrostatic actuator are formed is shown in FIG. 11.

Referring to FIG. 11, grooves are formed at predetermined intervals on a silicon substrate 120 having the conductivity. A silicon oxide layer 121 is formed on the surface of the silicon substrate 120 by a steam oxidation process. The silicon oxide layer 121 functions as an insulating layer. After this, silicon is deposited on the silicon oxide layer 121 by a Chemical Vapor Depositition (CVD) method. Ions are then implanted into the silicon layer by an ion implantation method so that the silicon layer has a conductivity. After this, the silicon layer is removed by the etch-back method until the silicon oxide layer 121 is exposed. As a result, electrodes 122 made of conductive silicon are formed in the silicon oxide layer 121 so as to be arranged at the predetermined intervals.

As has been described above, the supporting block 20 is formed by using a production process of semiconductor devices. Thus, the supporting block 20 having the smooth sliding surface 34 can be easily formed.

Figure 12:
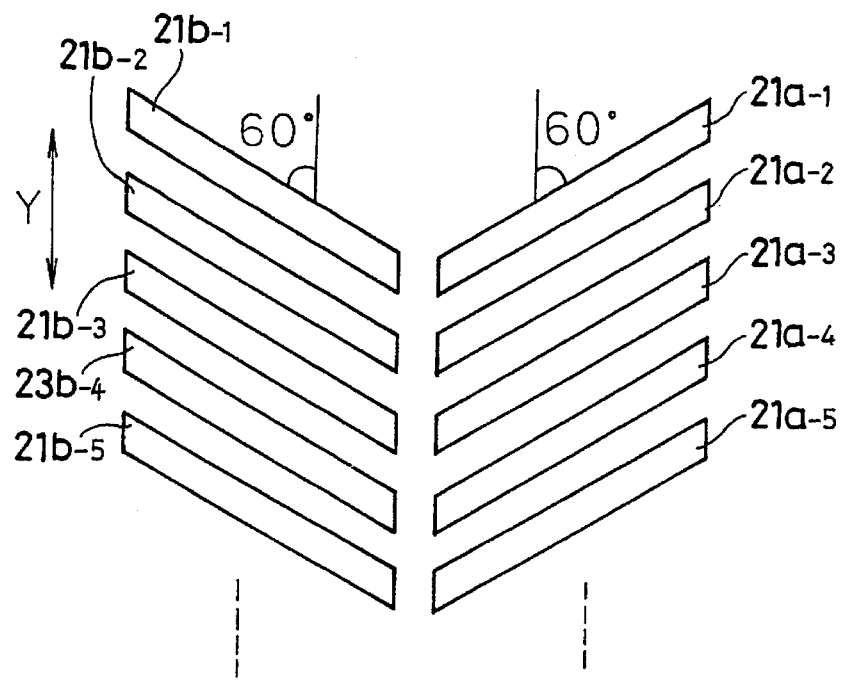
FIG. 12 is a diagram illustrating an arrangement of electrodes.

Another example of the arrangement of the electrodes of the electrostatic actuator is shown in FIG. 12.

Referring to FIG. 12, a first electrode group including electrodes $21_{a-1}, 21_{a-2}, \ldots, 21_{a-5}, \ldots$ and a second electrode group including electrodes $21_{b-1}, 21_{b-2}, \ldots, 21_{b-5}, \ldots$ are arranged in a V-shaped form. Each of the electrodes of the first and second electrodes group is inclined with respect to the direction (the Y direction) in which the recording plate 33 moves so that a narrow angle between the direction in which each electrode extends and the direction (the Y direction) in which the recording plate 33 moves is 60 degrees (60°). In this case, also the polarization strips formed in the ferroelectrics layer (the PZT-layer) are arranged in the same manner as the above electrodes arranged in the V-shaped form.

According to the above arrangements, in the V-shaped form, of the electrodes formed on the supporting block and the polarization strips formed on the ferroelectrics layer, the stably straight movement of the movable body (the recording plate 33) can be obtained. That is, in this case, even if the movable body moving on the supporting block skids in a direction perpendicular to the direction (the Y direction) in which the movable body moves, the attraction works between the polarization strips and the electrodes so that the movable body is returned to a regular position. As a result, the movable body can be moved straight on the supporting block.

Figure 13:
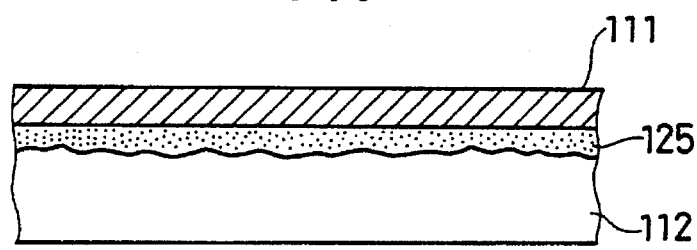
FIG. 13 is a cross sectional view showing another example of a structure of the recording plate.

FIG. 13 shows another embodiment of the structure of the recording plate 33 (the movable body).

Referring to FIG. 13, the ferroelectrics layer 112 made of the PZT, a low-melting glass layer 125 (a surface smoothing layer) and the medium layer 111 formed of the Co-layer as the foundation and the CoCrTa-layer are stacked. The recording plate 33 having the above stacked structure is made as follows. First, a PZT sheet having a thickness of 60

μm is formed by the doctor blade method, and the PZT sheet is sintered, so that the ferroelectrics layer 112 (the sintered body) is formed. The abrasion of a surface of the ferroelectrics layer 112 to which the dielectric polarizing process is to be applied is performed so that the surface is smoothed. A water glass layer is formed on a surface of the ferroelectrics layer 112 opposite to the smoothed surface by the spin coating method. The firing of the stacked structure of the ferroelectrics layer 112 and the glass layer is then performed at a low temperature. As a result, the low-melting glass layer 125 is formed on the surface of the ferroelectrics layer 112. The abrasion of the surface of the low-melting glass layer 125 is performed until the surface roughness, for example, the center line average roughness Ra reaches about 2 nm. In this state, the medium layer 111 having a thickness of 30 nm is formed on the low-melting glass layer 125.

The recording plate 33 having the above structure is about one-fourth as thin as that shown in FIG. 1 and FIG. 10. Thus, the recording plate 33 can be lightweight, so that the recording plate 33 can be moved at a high speed.

In the above embodiment, polyimide resin having flowability can be substituted for the water glass.

Figure 14:
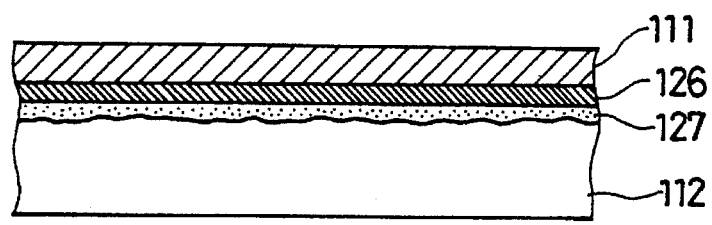
FIG. 14 is a cross sectional view showing another example of a structure of the recording palate.

FIG. 14 shows another example of the structure of the recording plate 33.

Referring to FIG. 14, the ferroelectrics layer 112 made of the PZT, an adhesive layer 127, a polyimide film 126 (the surface smoothing layer) and the medium layer 111 are stacked. The surface of the ferroelectrics layer 112 formed in the same manner as the above is coated with an adhesive. The polyimide film 126 under a condition in which a tractive force is applied thereto is pressed against the adhesive so that the polyimide film 126 is adhered to the ferroelectrics layer 112. In this state where the ferroelectrics layer 112, the adhesive layer 127 and the polyimide film 126 are stacked, the polyimide film 126 has the surface roughness represented by the center line average roughness Ra of about 2.5 nm. The medium 111 having the above structure is directly formed on the surface of the polyimide film 126.

The recording plate 33 having the above structure shown in FIG. 14 is about one-fourth as thin as that shown in FIG. 1 and FIG. 10. Thus, the recording plate 33 can be moved at a high speed.

Figure 15:
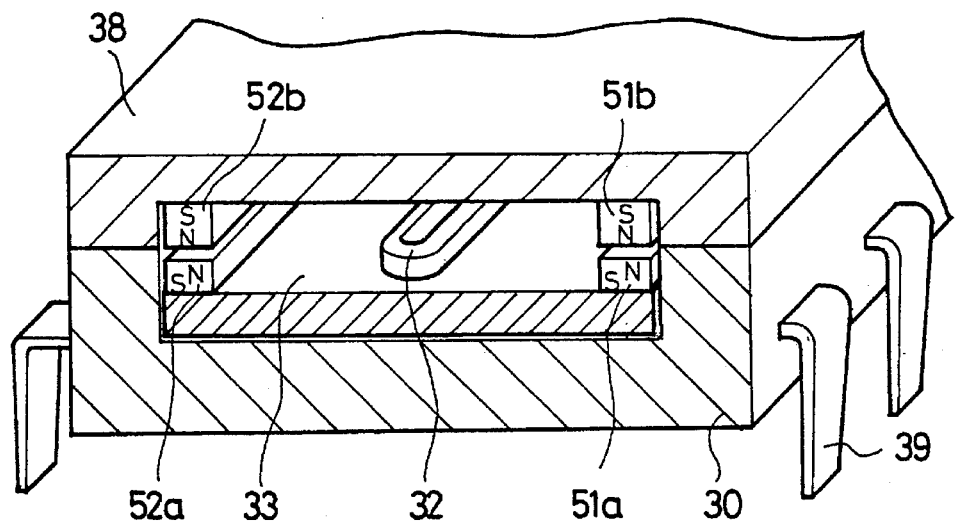
FIG. 15 is a diagram illustrating an example of a pressing mechanism for the recording plate.

FIG. 15 shows a mechanism for preventing the recording plate 33 from lifted out of the sliding surface.

Referring to FIG. 15, square-pillar-shaped magnets 51a and 52a are fixed on both side edge portions of the recording plate 33 slidably housed in the package 30. The respective magnets 51a and 52a are neodymium ferric boron bonded magnets. Each of the magnets 51a and 52a has, for example, the length of 7 mm, the height of 300 μm and the width of 1 mm. Square-pillar-shaped magnets 51b and 52b are fixed on both side edge portions of the inner wall of the lid 38 so as to face the above magnets 51a and 52a. The magnets 51a and 51b (52a and 52b) facing each other has the same magnetic pole (e.g. N-pole). Each of the magnets 51b and 52b has the same height and the same width as the above magnets 51a and 52a fixed on the recording plate 33 and has the length, for example, of 16 mm. Each of spaces between the magnets 51a and 51b and between the magnets 52a and 52b is, for example, 500 μm. The surface flux of each of the magnets is, for example, 200 Oe (oersted). This amount of the flux does not affect information in the medium layer. Due to the repulsions between the magnets 51a and 51b and between the magnets 52a and 52b, the recording plate 33 is pressed against the sliding surface, so that the recording plate 33 is prevented from being lifted out of the sliding surface.

Figure 16:
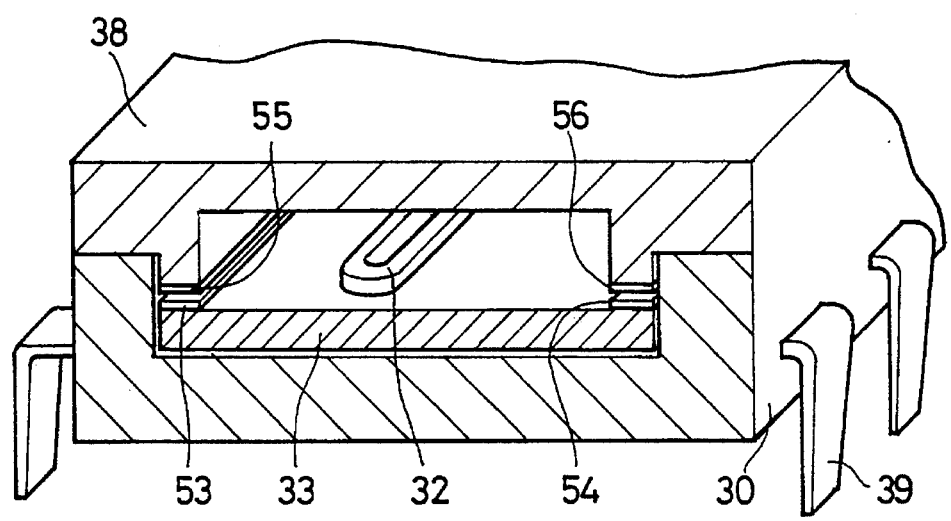
FIG. 16 is a diagram illustrating another example of the pressing mechanism for the recording plate.

FIG. 16 shows another mechanism for preventing the recording plate 33 from being lifted out of the sliding surface.

Referring to FIG. 16, square-pillar-shaped ferroelectrics (PZT) plates 53 and 54 are fixed on both side edge portion of the recording plate 33. The respective ferroelectrics plates 53 and 54 are formed at predetermined position on the recording plate 33 by the doctor blade method. Each of the ferroelectrics plates 53 and 54 has, for example, the thickness of 20 μm, the length of 7 mm and the width of 2 mm. In a state where the respective ferroelectrics plates 53 and 54 are maintained in silicon oil heated at 250° C., a process for making dielectric polarization in a direction perpendicular to the surface of the ferroelectrics plates 53 and 54 is executed by using external electrodes. As a result, polarization charges having a predetermined polarity (positive or negative) are distributed on the surfaces of the ferroelectrics plates 53 and 54. Aluminum electrodes 55 and 56 are fixed on both side edge portions of the inner wall of the lid 38 in correspondence with the ferroelectrics plates 53 and 54 polarized. Each of the aluminum electrodes 55 and 56 has the same thickness and the same width as the ferroelectrics plates 53 and 54, and has the length, for example, of 16 mm. In a state where the lid 38 is mounted on the package 30, spaces between the ferroelectrics plate 53 and the aluminum electrode 55 and between the ferroelectrics plate 54 and the aluminum electrode 56 are about 2 μm.

When the above magnetic recording device is driven, the aluminum electrodes 55 and 56 are provided with voltages having polarities which are the same as the polarization charges distributed on the ferroelectrics plates 53 and 54 (e.g. 2 volts). As a result, due to the repulsions between the aluminum electrodes 55 and 56 and the ferroelectrics plates 53 and 54, the recording plate 33 is pressed against the sliding surface, so that the recording plate 33 is prevent from being lifted out of the sliding surface.

Ferroelectrics plates in which the same polarization charges as the ferroelectrics plates 53 and 54 are distributed can be substituted for the aluminum electrodes 55 and 56. In this case, due to the repulsion between the ferroelectrics plates, the recording plate 33 is pressed against the sliding surface.

In the above embodiment, the recording plate 33 is in contact with the sliding surface 34. However, a dielectric layer formed of, solid, liquid or gas may be formed between the ferroelectric layer 12 of the recording plate 33 and the sliding surface 34.

The present invention is not limited to the aforementioned embodiments, and variations and modifications may be made without departing from the scope of the claimed invention.

What is claimed is:

1. An electrostatic actuator comprising:

a supporting body having a plurality of electrodes are formed at predetermined intervals; and a movable body having a ferroelectrics layer having an area on which polarization charges based on residual dielectric polarization are distributed in a predetermined polarity pattern so as to correspond to said plurality of electrodes of said supporting body, wherein due to changing, based on switching a pattern of polarities of voltages supplied to said plurality of electrodes, electrostatic attraction and repulsion between said plurality of electrodes of the supporting body and an area of said ferroelectrics layer on which the polarization charges are distributed, said movable body are moved on said supporting body.

2. The electrostatic actuator as claimed in claim 1, wherein said supporting body comprises:

a substrate layer; and an insulating layer formed on a surface of said substrate layer, said insulating layer has a surface on which said plurality of electrodes are arranged.

3. The electrostatic actuator as claimed in claim 1, wherein said supporting body comprises:

a silicon substrate layer; and an insulating layer made of silicon oxide, and wherein said plurality of electrodes are made of conductive silicon and are formed in said insulating layer so that surfaces of said plurality of electrodes are exposed.

4. The electrostatic actuator as claimed in claim 1, wherein said plurality of electrodes are arranged in a direction parallel to a direction in which said movable body is moved, respective electrodes extend in a direction inclined by a predetermined angle with respect to the direction in which said movable body is moved.

5. The electrostatic actuator as claimed in claim 4, wherein said plurality of electrodes are grouped into a first electrode group and a second electrode group which are arranged in a V-shaped form.

6. The electrostatic actuator as claimed in claim 1, wherein said movable body comprises:

a substrate layer having a surface on which said ferroelectrics layer is formed; and an object layer formed on another surface of said substrate layer, said object layer being an object to be moved by said electrostatic actuator.

7. The electrostatic actuator as claimed in claim 1, wherein said movable body comprises:

an object layer which is an object to be moved by said electrostatic actuator; and a surface smoothed layer sandwiched between said ferroelectrics layer and said object layer.

8. The electrostatic actuator as claimed in claim 7, wherein a surface smoothing layer is made of low-melting glass.

9. The electrostatic actuator as claimed in claim 7, wherein a surface smoothing layer is made of polyimide resin.

10. The electrostatic actuator as claimed in claim 9, wherein a surface smoothing layer is a polyimide film adhered to said ferroelectrics layer by a adhesive.

11. The electrostatic actuator as claimed in claim 10, wherein the polarity pattern in which the polarization charges are formed in said ferroelectrics layer based on the residual dielectric polarization has a pattern in which a pair of two positive polarities and a pair of two negative polarities are alternately arranged.

12. The electrostatic actuator as claimed in claim 1 further composing:

a mechanism for pressing said movable body against said supporting body so as to prevent said movable body from being lifted out of said supporting body.

13. The electrostatic actuator as claimed in claim 12, wherein said mechanism comprises:

a spring member for pressing said movable body against said supporting body.

14. The electrostatic actuator as claimed in claim 12, wherein said mechanism comprises:

a first magnet and second magnet, and wherein said movable body is pressed against said supporting body by using repulsion between said first and second magnets.

15. The electrostatic actuator as claimed in claim 12, wherein said mechanism comprises:

a ferroelectrics plate in which polarization charges having a predetermined polarity are formed based on residual dielectric polarization; and an electrode to which a voltage having a same polarity as said polarization charges formed in said ferrolelectrics plate is supplied, and wherein said movable body is pressed against said supporting body by using electrostatic repulsion between said ferroelectrics and said electrode.

16. The electrostatic actuator as claimed in claim 12, wherein said mechanism comprises:

a first ferroelectrics plate in which polarization charges having a predetermined polarity are formed based on residual dielectric polarization; and a second ferroelectrics plate in which polarization charges having a same polarity as the polarization charges of said first ferroelectrics are formed based on the residual dielectric polarization, and wherein said movable body is pressed against said supporting body by using electrostatic repulsion between said first and second ferroelectrics plates.

* * * * *